(12) United States Patent
Pasha

(10) Patent No.: US 12,461,982 B2
(45) Date of Patent: Nov. 4, 2025

(54) DYNAMIC BOOKMARKS

(71) Applicant: OPEN TEXT HOLDINGS, INC., Menlo Park, CA (US)

(72) Inventor: Syed Haroon Pasha, Hyderabad (IN)

(73) Assignee: Open Text Holdings, Inc., Menlo Park, CA (US)

( * ) Notice: Subject to any disclaimer, the term of this patent is extended or adjusted under 35 U.S.C. 154(b) by 135 days.

(21) Appl. No.: 18/318,107

(22) Filed: May 16, 2023

(65) Prior Publication Data

US 2024/0386069 A1 Nov. 21, 2024

(51) Int. Cl.
G06F 16/955 (2019.01)
G06F 16/9538 (2019.01)
H04L 67/02 (2022.01)

(52) U.S. Cl.
CPC ...... *G06F 16/9562* (2019.01); *G06F 16/9538* (2019.01); *H04L 67/02* (2013.01)

(58) Field of Classification Search
None
See application file for complete search history.

(56) References Cited

U.S. PATENT DOCUMENTS

| | | | | |
|---|---|---|---|---|
| 6,041,360 A * | 3/2000 | Himmel | | G06F 16/9562 707/999.001 |
| 6,208,955 B1 * | 3/2001 | Provan | | G06F 11/2257 709/201 |
| 6,314,423 B1 * | 11/2001 | Himmel | | G06F 16/9562 |
| 8,239,367 B1 * | 8/2012 | Zamir | | G06F 16/9562 707/710 |
| 10,904,210 B2 * | 1/2021 | Zhu | | H04L 61/4594 |
| 12,056,201 B2 * | 8/2024 | Moreau-Arnott | | G06F 9/451 |
| 2002/0116411 A1 * | 8/2002 | Peters | | G06F 16/9562 715/234 |
| 2002/0156832 A1 * | 10/2002 | Duri | | G06F 16/9562 707/E17.108 |
| 2008/0177858 A1 * | 7/2008 | Aarnio | | G06F 16/9562 709/217 |

(Continued)

OTHER PUBLICATIONS

Novakovic, Danilo, Chrome Dynamic Bookmarks Extension, retrieved at: chrome.google.com/webstore/detail/dynamic-bookmarks/ilhojkjlfkppedidhpecepohnmlndopb, 9 pgs.

*Primary Examiner* — Lashonda Jacobs-Burton
(74) *Attorney, Agent, or Firm* — Sprinkle IP Law Group

(57) ABSTRACT

Systems, methods and products for providing a dynamic bookmarks list feature. In one embodiment, a user provides a name and an endpoint to a module that creates a dynamic bookmark in a web browser. When the dynamic bookmark is accessed, an API call is made to the endpoint. The endpoint recognizes a query parameter in the API call and retrieves a list of bookmarks and/or folders of bookmarks and returns them to the browser. The browser presents the bookmarks and/or folders to the user in a list in the same manner as individual, manually created bookmarks are presented. The user then accesses any of the listed bookmarks in the same manner as a conventional, manually created bookmark. The contents of listed folders may not be retrieved until the folder is accessed. These contents are retrieved in the same way the listed bookmarks and folders were retrieved.

19 Claims, 9 Drawing Sheets

(56) References Cited

U.S. PATENT DOCUMENTS

| | | | |
|---|---|---|---|
| 2009/0164903 A1* | 6/2009 | Patel | G06F 16/9562 715/721 |
| 2011/0078232 A1* | 3/2011 | Van Den Driessche | G06F 40/134 715/234 |
| 2016/0104513 A1* | 4/2016 | Bloch | G11B 27/34 715/720 |
| 2016/0188742 A1* | 6/2016 | Ingvoldstad | G06F 16/9562 707/722 |
| 2017/0193122 A1* | 7/2017 | Wright | G06F 16/958 |

* cited by examiner

DYNAMIC BOOKMARKS

TECHNICAL FIELD

This disclosure relates generally to bookmarks, and more specifically to systems and methods for automatically retrieving bookmarks for multiple items through a dynamic bookmark application programming interface (API).

BACKGROUND

One of the features that is commonly provided in a web browser is the capability of "bookmarking" links. A bookmark is a stored indicator of a link, such as a Uniform Resource Identifier (URL). Bookmarks may also be referred to as "favorites," "shortcuts," etc. Bookmarks allow a user of a web browser to save a list of favorite or frequently accessed links, or links that they anticipate visiting again, so that they can quickly and easily access the links.

When a bookmark stored by a web browser is accessed ("clicked on"), the link associated with the bookmark is retrieved, and the resource identified by the link is accessed. For example, if the user frequently accesses a particular website, such as a news site, the user may bookmark the website so that they can return to it without having to remember the URL for the web site or spend time searching for the web site. Bookmarks are typically accessed through a menu in the web browser, and may be organized by the user into folders or groups of similar or associated bookmarks.

Conventionally, bookmarks must be added to the web browser manually by the user. It is not unusual for the links on a webpage to change, in some cases on a regular basis. If the links associated with bookmarks added by a user change, the bookmarks are no longer valid, so they will no longer work until they are manually updated by the user.

While it may be a simple matter to add or update a small number of bookmark to a web browser, or to organize and save a known list of website links, it may become much more burdensome if there are a large number of bookmarks that must be saved. For example, bookmarks may be used to store links to items such as files and folders which are stored on a cloud data storage system. Commonly, the number of items that are stored by a user, or which are stored on a cloud data storage system so that they can be accessed by the user, is very large, so manually saving links to each of the items that the user may need to access becomes a very tedious and time consuming process.

SUMMARY

To overcome this problem, embodiments disclosed herein incorporate a dynamic bookmarks list feature. This feature enables dynamic retrieval, via a REST API, of bookmarks for a list of items so that the bookmarks do not have to be individually stored manually by the user. This avoids the user having to take the time to navigate to the linked items or web pages, and also avoids the computational expense of having to load the documents or web pages when the user navigates to them so that they can be bookmarked. Additionally, the dynamic bookmark feature may retrieve folders of bookmarks, where the individual bookmarks in the folder need not be retrieved unless the user accesses the folder (which may be referred to as "lazy loading"). This avoids the computational expense of retrieving the folder's bookmarks unless the user chooses to view the individual bookmarks.

In some embodiments, the user creates a dynamic bookmark in a web browser. The user provides a name for the group of bookmarks to be retrieved, as well as an endpoint (e.g., URL) from which the group of bookmarks will be retrieved. The endpoint is a web site or other resource which is configured with a REST API that can be called via the dynamic bookmark. When the endpoint receives the API call, it retrieves the list of bookmarks and/or folders of bookmarks which are identified by the API call and returns them to the browser. The browser then presents the bookmarks and/or folders to the user in a list in essentially the same way it would present bookmarks and/or folders that were manually created by the user. The user then accesses any of the listed bookmarks in the same manner as a conventional, manually created bookmark. If a listed folder is accessed, the web browser retrieves the bookmarks in the accessed folder in the same way the listed bookmarks and folders were retrieved.

One exemplary embodiment comprises a method for dynamically obtaining bookmarks in a browser application. In this method, a dynamic bookmark is provided in a browser application. A bookmark module in the browser application is configured to store one or more dynamic bookmarks, each dynamic bookmark designating a corresponding URL and including a query parameter indicative of the dynamic bookmark. In response to a user accessing a first one or more bookmarks, the browser application makes an API call to the corresponding URL. The browser application then receives, in response to the API call, a list of bookmarks associated with the URL. The browser application displays the list of bookmarks in a window of the browser application and enables each bookmark in the list to be accessed by a user to retrieve a linked resource corresponding to the bookmark.

In some embodiments, the bookmark module is configured to receive input from a user including a name for the first dynamic bookmark and the URL corresponding to the first dynamic bookmark. The bookmark module then creates a dynamic bookmark for the URL. Receiving the list of bookmarks associated with the URL may comprise receiving a top-level list that includes at least one folder, where a sublist of bookmarks contained in the at least one folder is not retrieved unless the at least one folder is accessed. The folders in the list may be accessed by clicking on the folder in the browser application, or by hovering a cursor over the folder in the browser application.

The query parameter of the dynamic bookmark indicates that a list of bookmarks associated with the URL are to be returned responsive to accessing the dynamic bookmark. The URL may, for example, be a web page, and the API call for the URL may return a list of active bookmarks contained in the web page. The URL may also be a folder (such as in a cloud storage) and the API call for the URL may return a list of active bookmarks to files contained in the folder. A resource identified by the URL may be configured to recognize the indicator of the dynamic bookmark query parameter and in response to recognizing the indicator of the dynamic bookmark query parameter, generating a set of one or more active bookmarks and returning the set of one or more active bookmarks to the browser application.

In some embodiments, the dynamic bookmark module comprises a plug-in to the browser application. In other embodiments, the dynamic bookmark module comprises software code that is integral to the browser application.

An alternative embodiment comprises a server-oriented method for dynamically providing bookmarks. In this method a server receives a request including a URL and a dynamic bookmark query parameter. The request may comprise a REST API call. The server recognizes the dynamic bookmark query parameter in the request and, in response, retrieves a set of active bookmark links contained in a resource identified by the URL. In response to the request, the server then returns the set of active bookmark links instead of the resource identified by the URL.

In some embodiments, the server comprises a content server, where the resource identified by the URL comprises a folder and the set of active bookmark links comprise links to files contained in the folder. In other embodiments, the server comprises a web page server, where the resource identified by the URL comprises a web page and the set of active bookmark links comprise links to items contained in the web page.

Another alternative embodiment comprises a computer program product in which a non-transitory computer-readable medium stores instructions executable by one or more processors. The instructions are executable to store one or more dynamic bookmarks, each dynamic bookmark designating a corresponding URL and including a query parameter indicative of the dynamic bookmark. The instructions are further executable to make an API call to the corresponding URL in response to accessing a first one of the bookmarks. The instructions are further executable to receive a list of bookmarks associated with the URL in response to the API call. The instructions are further executable to display the list of bookmarks in a window of the browser application and to, for each bookmark in the list, enable a user to retrieve a linked resource corresponding to the bookmark.

In some embodiments, the instructions are further executable by the processors to receive input from a user, the input including a name for the first dynamic bookmark and the URL corresponding to the first dynamic bookmark, and to create a dynamic bookmark for the URL. In some embodiments, receiving the list of bookmarks associated with the URL comprises receiving a top-level list that includes at least one folder, where a sublist of bookmarks contained in the folder is not retrieved unless the folder is accessed, either by clicking on the folder in the browser application, or by hovering a cursor over the folder in the browser application.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein provide a dynamic bookmarks feature. This feature enables dynamic retrieval, via a REST API, of a group of bookmarks that are associated with an endpoint such as a web site. A list of the bookmarks is retrieved so that the individual bookmarks do not have to be manually created and stored by the user. When the user creates a dynamic bookmark, the user provides a name for the dynamic bookmark and an endpoint (e.g., URL) from which the group of bookmarks will be retrieved. The endpoint is a web site or other resource which is configured with a REST API that can be called via the dynamic bookmark. When the endpoint receives the API call, it retrieves the list of bookmarks and/or folders of bookmarks which are identified by the API call and returns them to the browser. The browser then presents the bookmarks and/or folders to the user in a list in essentially the same way it would present bookmarks and/or folders that had previously been manually created by the user. The user then accesses any of the listed bookmarks in the same manner as a conventional, manually created bookmark. If a listed folder is accessed, the web browser retrieves a sublist of bookmarks in the accessed folder in the same way the listed bookmarks and folders were retrieved.

The dynamic bookmark feature avoids the user having to take the time to navigate to the linked items or web pages, as well as the computational expense of having to load the documents or web pages when the user navigates to them (for the purpose of bookmarking them). If the retrieved list of bookmarks includes folders, the dynamic bookmark feature may be configured to defer retrieving bookmarks contained in the folders until the user specifically accesses these folders. This avoids the computational expense of retrieving the folders' contents (a sublist of bookmarks) unless the user chooses to view the contents of the folders.

Figure 1:
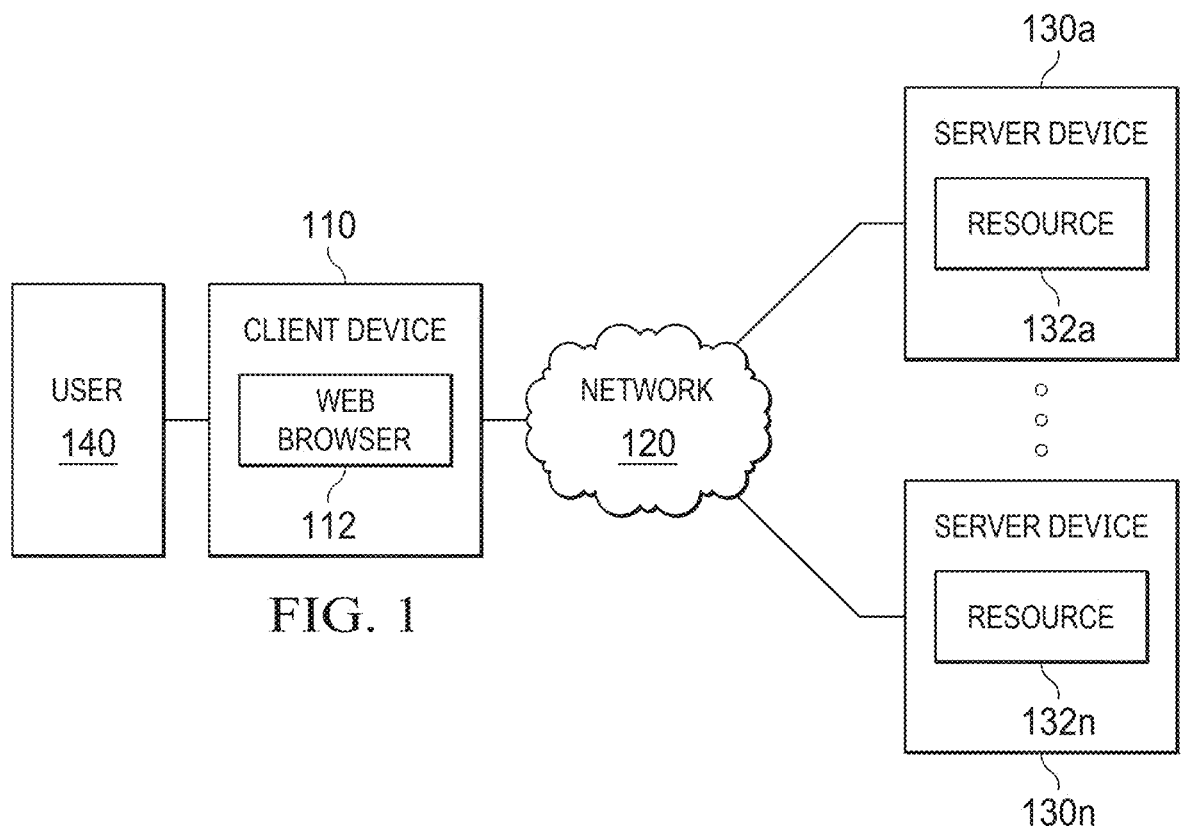
FIG. 1 is a diagram illustrating a networked computing environment including a client device and a set of server devices in accordance with the prior art.
Figure 2:
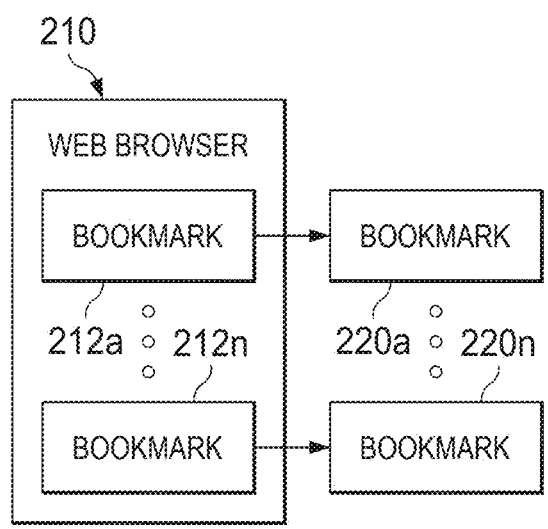
FIG. 2 is a diagram illustrating the relationship between bookmarks in the web browser and the resources and web sites in accordance with the prior art.

Referring to FIGS. 1 and 2, a set of diagrams illustrating the use of bookmarks in the prior art is shown. FIG. 1 shows a networked computing environment including a client device and a set of server devices. FIG. 2 shows the relationship between bookmarks in the web browser and the resources and web sites.

Referring to FIG. 1 the relationship of a client device executing a web browser and a set of servers containing resources and web sites is shown. As depicted in FIG. 1, a client device 110 is connected to the network 120 such as the Internet. Similarly, a set of server devices 130A-130N are connected to network 120 so that they can communicate with client device 110.

In the networked computing environment of FIG. 1, client device 110 and server devices 130 are bi-directionally coupled to each other through network 120. Network 120 may represent a combination of wired and wireless networks that the networked computing environment may utilize for various types of communications known to those skilled in the art.

For the purpose of illustration, a single device is shown for each of the client and server devices, but for each of these devices, a plurality of computers may be interconnected to each other, directly or via a network (e.g., 120). The computers may include, for example, central processing units ("CPUs"), read-only memories ("ROMs"), random access memories ("RAMs"), hard drives ("HDs") or storage memories, and input/output device(s) ("I/O"). I/O can include a keyboard, monitor, printer, electronic pointing device (e.g., mouse, trackball, stylus, etc.), or the like. The computers can include server computers, desktop computers, laptop computers, personal digital assistants, cellular phones, or nearly any device capable of communicating over a network. Many alternative configurations are possible and known to skilled artisans.

In the example of FIG. 1, a user 140 can access a web browser 112 executing on client device 110. Web browser 112 is capable of accessing websites or other resources (e.g., 132) that are available on server devices 130. User 140 may navigate web browser 112 to any of these resources and may retrieve the resources so that they may be viewed or otherwise used by the user. User 140 may also manually create bookmarks that are linked to the respective resources. The bookmarks may later be accessed via web browser 112 in order to later retrieve the corresponding linked resources.

FIG. 2 is a diagram illustrating the relationship between bookmarks that have been conventionally stored by a web browser and the resources and web sites to which the bookmarks are linked. In this diagram, browser 210 has a plurality of stored bookmarks 212a-212n which have been stored by a user. Each of bookmarks 212a-212n is linked to a corresponding linked resource 220a-220n.

As described above, in a conventional web browser, the user navigates to a particular resource and then manually creates a bookmark in the web browser corresponding to the resource. In the example of FIG. 1, the user would have navigated to linked resource 220a and then created bookmark 212a, which is linked to this resource. This would have been repeated by the user, who would have navigated to each individual linked resource 220 and then created the corresponding bookmark 212.

Navigating to each resource and then manually creating the corresponding bookmark expends not only the time and effort of the user, who has to manually create the bookmarks, but also expends computational resources, in that when the user navigates to each resource, the web browser must communicate with the corresponding servers of these resources and retrieve the resources for presentation to the user before they are bookmarked.

Figure 3:
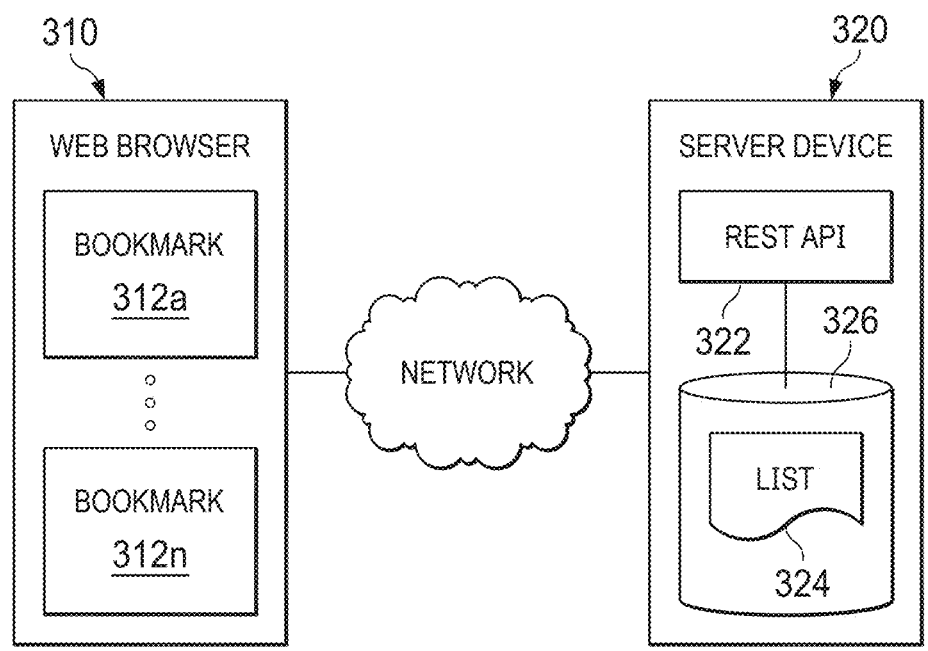
FIG. 3 is a diagram illustrating the use of dynamic bookmarks to reduce the cost of creating and updating bookmarks in accordance with some embodiments.

The embodiments in this disclosure reduce the cost of having to manually create bookmarks for linked resources. Referring to FIG. 3, a diagram is shown to illustrate the use of dynamic bookmarks to reduce the cost of creating and updating bookmarks in accordance with some of the embodiments disclosed herein. The dynamic bookmark feature may be implemented in a module of the web browser such as a plug-in to the browser. Alternatively, the bookmark feature may be implemented in code that is integral to the web browser.

As depicted in FIG. 3, web browser 310 stores one or more dynamic bookmarks 312. Each dynamic bookmark 312 is created by a user to include a name and an endpoint, as will be described in more detail below. The endpoint specified for the dynamic bookmark includes a specific query parameter which is associated with the dynamic bookmark feature. This query parameter serves as an indication that, when the user accesses the dynamic bookmark, the user wishes to retrieve a set of bookmarks that are associated with the identified endpoint (e.g., website or other resource). In other words, when the identified endpoint is accessed, the server recognizes the query parameter and processes the communication as a call to the dynamic bookmarks API.

When the user accesses a dynamic bookmark (e.g., 312a), rather than retrieving a specific resource to which the bookmark is linked, a corresponding dynamic bookmark call is made to a REST API of the identified endpoint. In this example, the endpoint is hosted by server 320. The API call is processed by dynamic bookmark API 322 to retrieve a list of bookmarks 324 which is stored in a data storage 326 of server 320. Bookmark list 324 is and then returned to browser 310. The user may then access the linked resources and/or folders that are retrieved via the dynamic bookmarks API. The dynamic bookmarks feature may be configured to use "lazy loading" so that individual linked resources contained in a particular folder are not retrieved when the folder is retrieved, but are instead retrieved when the folder itself is accessed by the user.

Figure 4:
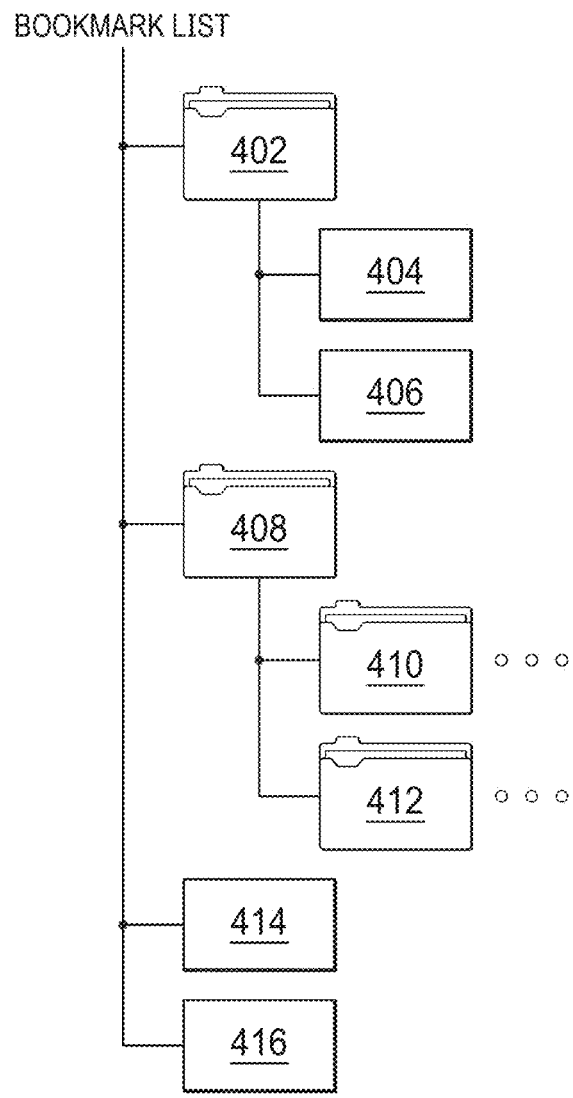
FIG. 4 is a block diagram illustrating potential components of a bookmark list in accordance with some embodiments.

Referring to FIG. 4, a diagram illustrating potential components of bookmark list 324 is shown. In this example, bookmark list 324 includes both linked folders and individual linked resources. The files and folders may be included in a hierarchical structure where each folder may contain subfolders and or linked resources. For instance, the top level of bookmark list 324 includes folders 402 and 408, as well as linked resources 414-416. Folder 402 contains a set of linked resources 404-406. Folder 408 contains a set of subfolders 410-412, each of which may itself contain additional subfolders and/or linked resources which are not explicitly shown in the figure.

Although only a small number of folders and linked resources are depicted in the figure, a bookmark list may include any number of folders and/or linked resources, and each of the subfolders may include any number of additional subfolders and/or linked resources. Additionally, the files and or folders may be structured in any suitable fashion and need not be organized in a hierarchical fashion.

Figure 5:
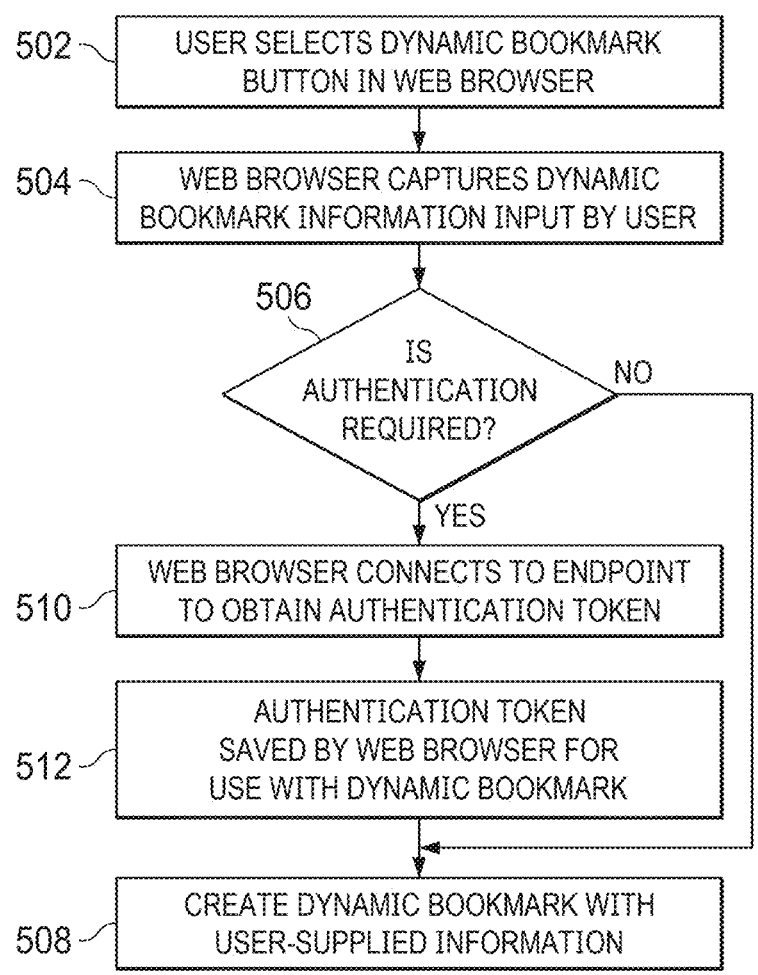
FIG. 5 is a block diagram illustrating a process for creating and using a dynamic bookmark in accordance with some embodiments.

Referring to FIG. 5, a flow diagram illustrating a process for creating and using a dynamic bookmark in accordance with some embodiments is shown. As depicted in this figure, after a user opens a web browser, the user is presented with a dynamic bookmark button which the user selects to create a dynamic bookmark (step 502). The dynamic bookmark button may, for example, be presented in a drop down menu with other options, such as adding a new individual bookmark or adding a new bookmark folder. Selecting (clicking on) the dynamic bookmark button causes the web browser to open a dialog box which is presented to the user to prompt the user to enter information associated with the dynamic bookmark. Dynamic bookmark information is captured by the web browser and is saved for use in creating the dynamic bookmark (step 504).

The information provided by the user includes a name for the bookmark and an endpoint for the bookmark. As noted above, the endpoint includes a query parameter indicative of the fact that the dynamic bookmark will access an API that retrieves a list of bookmarks, rather than accessing and retrieving a specific individual resource. Thus, the query parameter indicates the type of call that is being made, as well as the type of response that is expected.

The same URL could therefore retrieve different results, depending upon whether or not the query parameter is included at the end of the specified endpoint. For instance, if the URL is a website, a conventional bookmark specifying this website would return the corresponding web page (e.g., the home page), but a dynamic bookmark specifying the same website along with the query parameter would return a list of bookmarks contained in the specified website.

In some embodiments, a server may not be configured to provide the dynamic bookmark feature. In this case, if a dynamic bookmark is accessed in a web browser, the query parameter may be disregarded by the server of the specified endpoint, so that the dynamic bookmark functions as a conventional bookmark and retrieves the identified web page rather than a list of bookmarks associated with the web page.

Referring again to FIG. 5, the web browser may determine when creating the dynamic bookmark that authentication is required (step 506). In some embodiments, the web browser may prompt the user to indicate whether or not authentication is required. If no authentication is required, the web browser will simply create the dynamic bookmark with the user-provided information (step 508).

If, at step 506, the website determines that authentication is required (e.g., if the user indicates the authentication is required), the web browser will connect to the website or appropriate endpoint and will retrieve an authentication token (step 510). In some embodiments, the web browser will connect to the website and will enable the user to enter information to authenticate the user against the website so that the authentication token can be obtained. After the authentication token is obtained, the token is saved by the web browser (step 512). The dynamic bookmark is then created (step 508). The saved authentication token which is associated with the dynamic bookmark is then transmitted by the web browser to the website when the dynamic bookmark is accessed.

Figure 6:
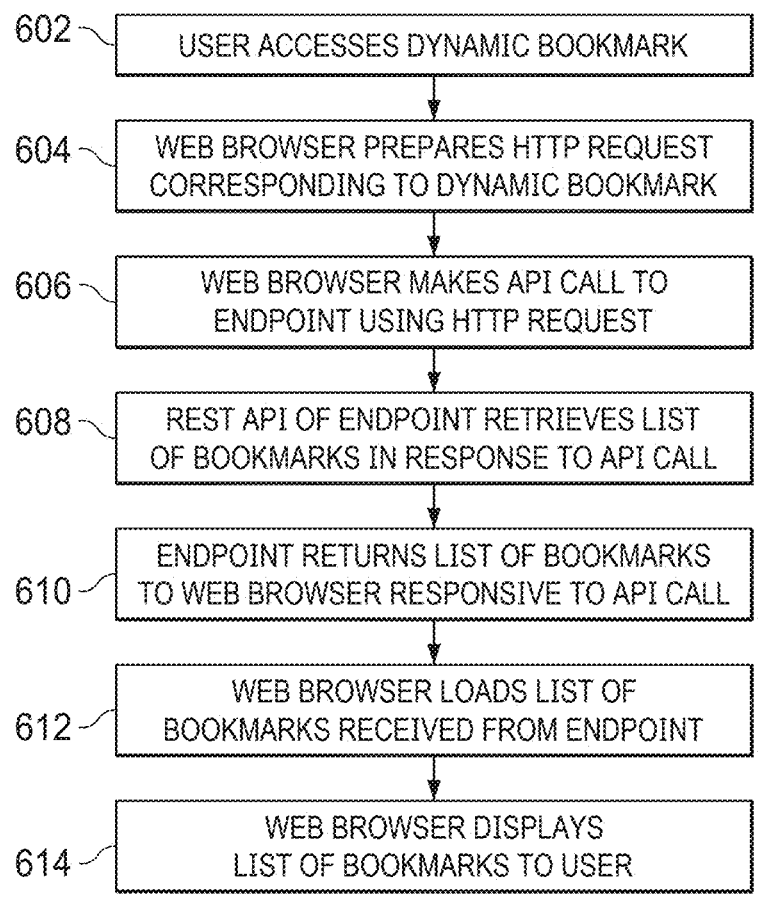
FIG. 6 is a block diagram illustrating a process for using a dynamic bookmark in accordance with some embodiments.

Referring to FIG. 6, a flow diagram illustrating a process for using a dynamic bookmark in accordance with some embodiments is shown. When a user accesses (e.g., clicks on) a dynamic bookmark (step 602), a corresponding HTTP request is prepared (step 604). The HTTP request makes a call to the specific resource identified as the endpoint of the dynamic bookmark. The HTTP request includes a header that is customized for the dynamic bookmark to indicate the type of response that is expected by the web browser (i.e., a list of bookmarks associated with the end point). The HTTP request also includes the user's authentication token if one has been obtained and stored for the dynamic bookmark.

After the HTTP request for the dynamic bookmark has been prepared, the web browser makes an API call to the endpoint specified in the dynamic bookmark (step 606). The API call is received by the REST API of the endpoint, which then retrieves a list of links to files and or folders associated with the endpoint (608). The retrieved list of files and or folders is then returned from the endpoint to the web browser (step 610).

When the list of files and or folders from the endpoint is received by the web browser, the web browser loads the list of bookmarks (step 612) and displays the bookmarks to the user (step 614). Links to the files are displayed as individual bookmarks that can be accessed by the user. Links to the folders are displayed as subfolders of the dynamic bookmark.

In some embodiments, the bookmarks that are contained within the subfolders retrieved in response to accessing the dynamic bookmark are not themselves retrieved in response to the initial API call. This is referred to as "lazy loading." It is not until the user accesses a subfolder that the contents of the accessed subfolder are retrieved by the web browser. The subfolder may be accessed by clicking on the subfolder, or simply "hovering" the web browser's cursor over the folder. This causes the web browser to retrieve the links contained in the subfolder. Lazy loading avoids the use of computational resources associated with retrieving the links contained in the subfolder until these links are actually needed by the user (to either access or view the links).

Although it is less efficient to download all of the links contained in the sub folders upon initially accessing the top-level dynamic bookmark, some alternative embodiments may do so.

Figure 7:
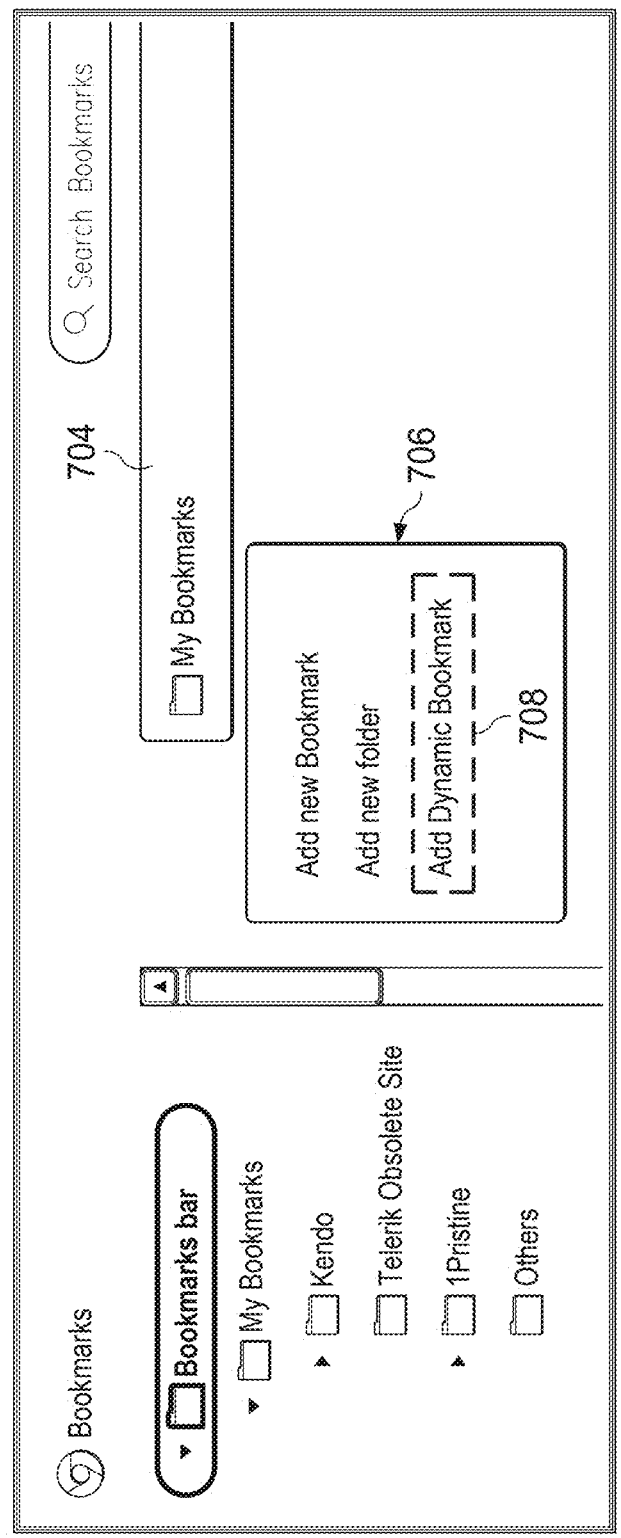
FIG. 7 is a block diagram illustrating the creation of a dynamic bookmark in accordance with some embodiments.
Figure 8:
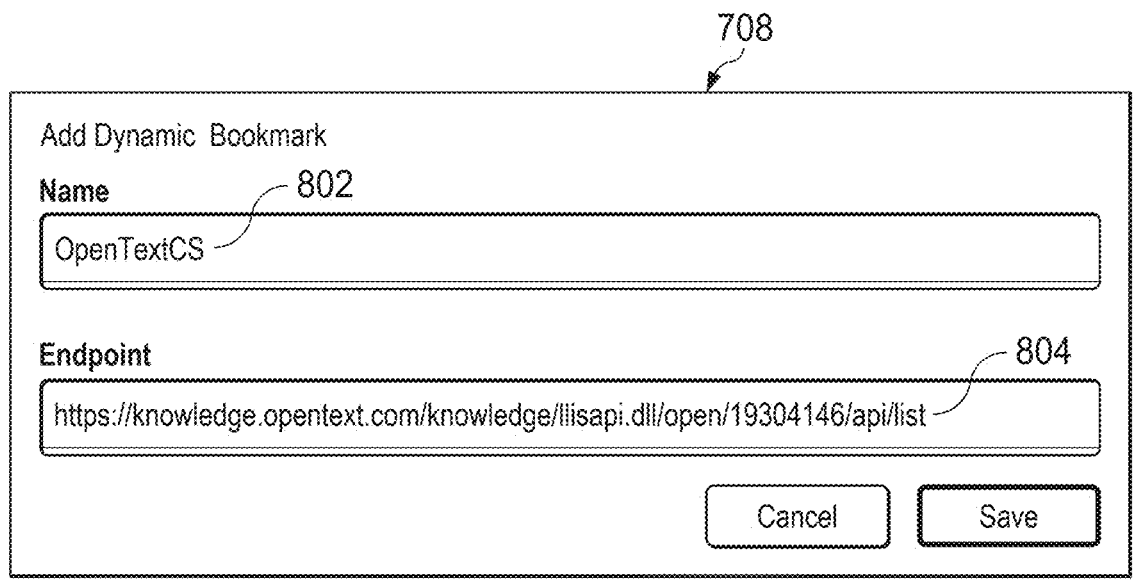
FIG. 8 is a block diagram illustrating a window that prompts the user for information needed to construct a dynamic bookmark in accordance with some embodiments.
Figure 9:
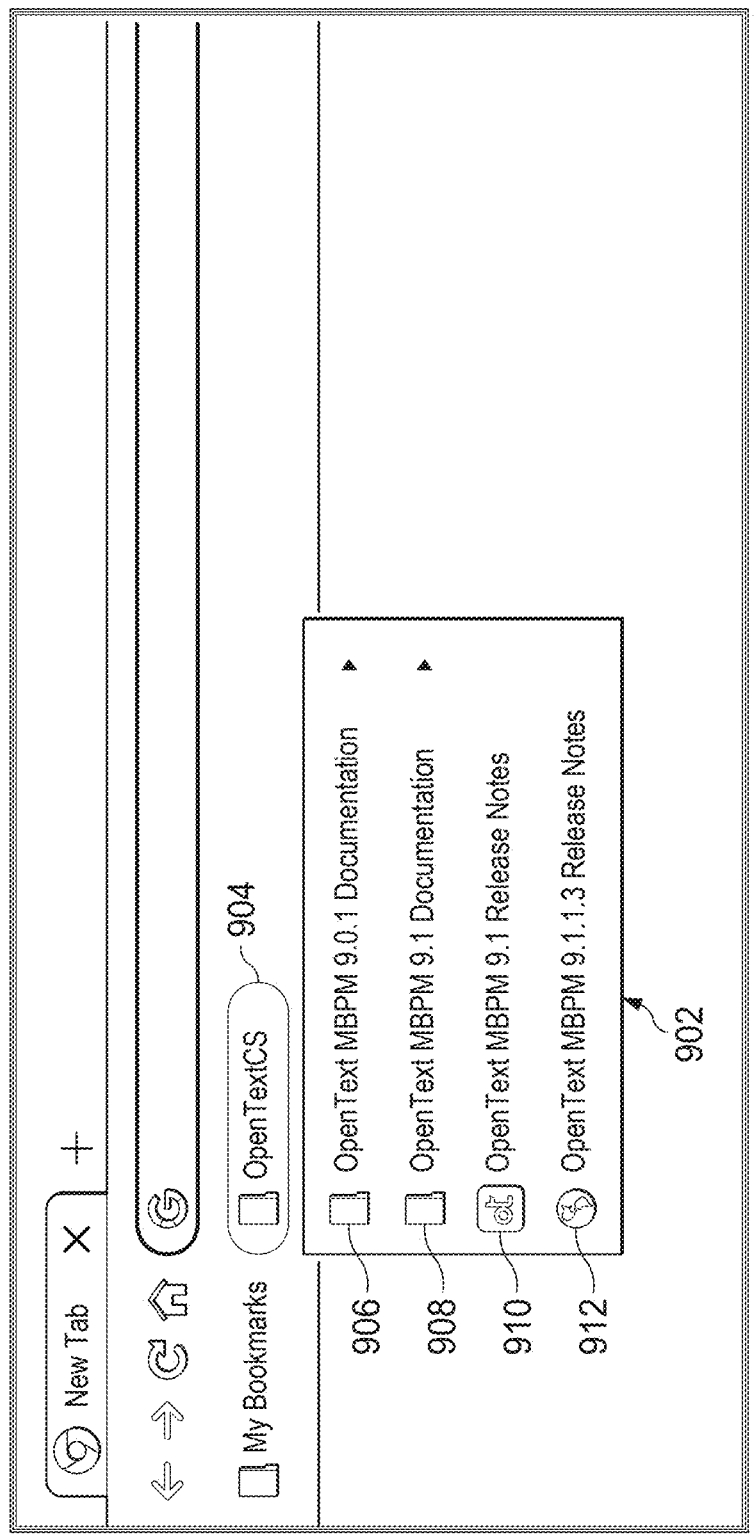
FIG. 9 is a block diagram illustrating a screenshot of a list of bookmarks retrieved using a dynamic bookmark function in accordance with some embodiments.
Figure 10:
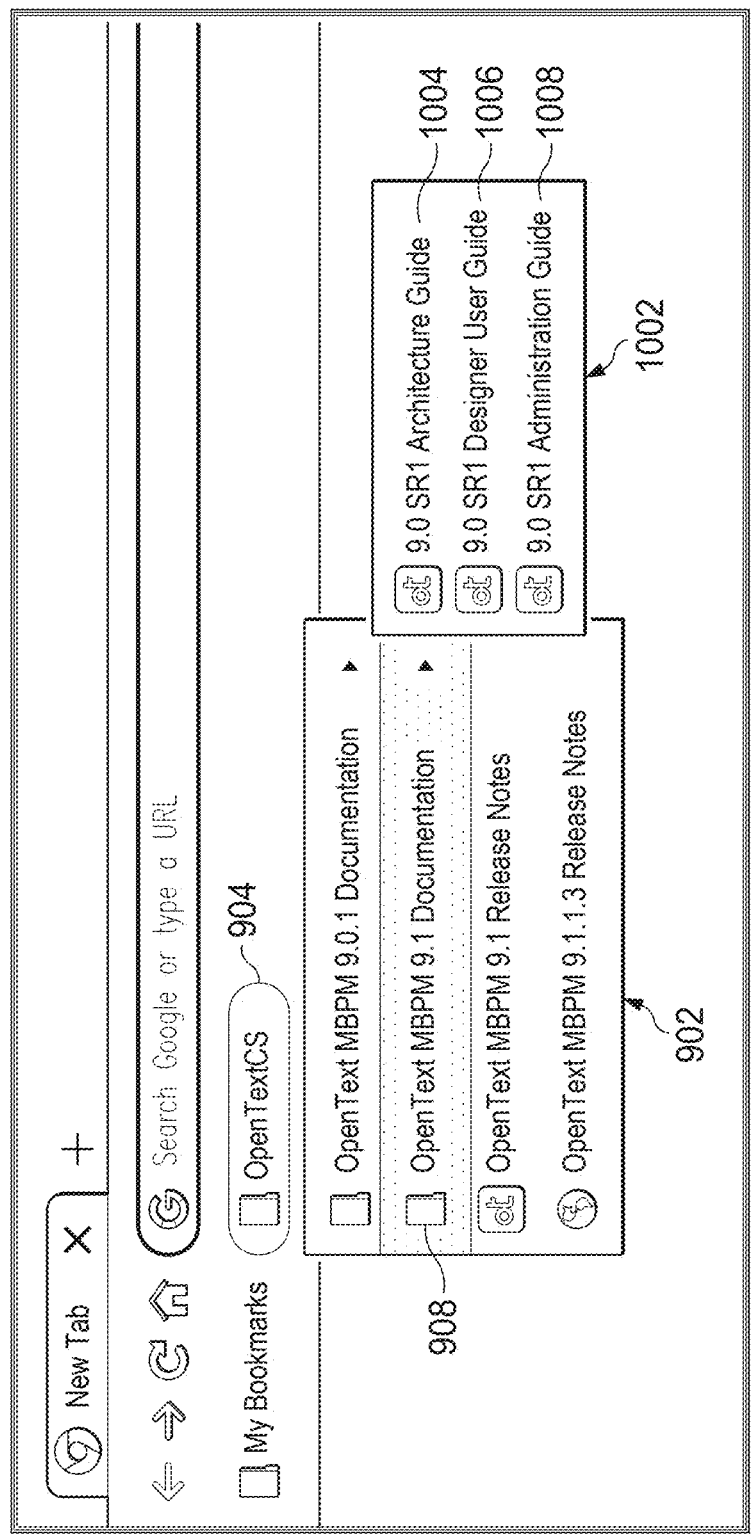
FIG. 10 is a block diagram illustrating a screenshot of a second-level list of bookmarks contained in a folder in a top-level list in accordance with some embodiments.

Referring to FIGS. 7-10, a set of diagrams illustrating screenshots associated with the creation and use of the dynamic bookmarks in accordance with some embodiments are shown. FIG. 7 is a diagram showing the creation of a dynamic bookmark. FIG. 8 illustrates a window that prompts the user for information needed to construct a dynamic bookmark. FIG. 9 illustrates a screenshot of the list of bookmarks retrieved using the dynamic bookmark function. FIG. 10 illustrates a screenshot of a second-level list of bookmarks contained in a folder in the top-level list.

Referring to FIG. 7, a diagram illustrating the creation of a dynamic bookmark is shown. In this figure, a web browser screen is depicted. When the bookmarks page of the web browser is opened, a bookmarks bar 704 is presented to the user. When the user selects bookmarks bar 704, a drop down menu 706 is presented to the user. In this case, the options presented in the dropdown menu include "add new bookmark", "add new folder" and "add dynamic bookmark".

When the user selects "add dynamic bookmark" (708), the web browser presents a window that prompts the user for information needed to construct a dynamic bookmark. This "add dynamic bookmark" window is depicted in FIG. 8. In this particular example, the user is prompted to provide a name (802) for the dynamic bookmark, and an endpoint (804) for the dynamic bookmark. After the user enters the appropriate information in response to these prompts, the user clicks "save" to create the dynamic bookmark.

As noted above, in some instances, the user may need to be authenticated for the designated endpoint. The web browser may therefore present the user with an additional window (not shown in the figure) if needed to enter the required authentication information. In some embodiments, the web browser may connect to the endpoint and allow the user to authenticate directly with the endpoint. In some embodiments, the user may be authenticated when the dynamic bookmark is created (i.e., prior to the first use of the dynamic bookmark). In other embodiments, the user may be prompted to provide the required authentication information when the dynamic bookmark is first accessed (after it has been created) and the web browser attempts to connect to the endpoint and retrieve the associated list of bookmarks.

Referring to FIG. 9, a diagram illustrating a screenshot of the retrieved list of bookmarks is shown. As depicted in this figure, after the dynamic bookmark 904 has been accessed to make an API call to the end point and the list of bookmarks associated with the endpoint has been retrieved, the list of bookmarks is displayed to the user in a drop down window 902. In this embodiment, the drop down window initially includes only the top level bookmarks associated with the dynamic bookmark.

In example of FIG. 9, the top level set of bookmarks includes two subfolders 906 and 908, and two linked documents 910 and 912. If the user clicks on either bookmark 910 or bookmark 912, the corresponding document will be retrieved from the endpoint and displayed to the user in the same manner as if the user had accessed a conventional bookmark. If the user clicks on one of subfolders 906 or 908, the web browser will retrieve a second list of bookmarks (a sublist) that are contained in the respective subfolder.

Referring to FIG. 10, a diagram illustrating a screenshot of a second-level second list of bookmarks is shown. In this example, subfolder 908 is accessed to retrieve a second list 1002 of bookmarks. List 1002 includes a set of bookmarks 1004, 1006 and 1008. This second list of bookmarks could include further subfolders in addition to these individual bookmarks. The second list of bookmarks may be retrieved in substantially the same manner as the top-level list of bookmarks associated with the endpoint. As noted above, the second list of bookmarks may be retrieved in response to the user hovering over the subfolder rather than clicking on the subfolder.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that the network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for avoiding manual user updates of invalid links by dynamically obtaining valid, updated bookmarks, the method comprising:
   providing, in a browser application, a dynamic bookmark module;
   wherein the dynamic bookmark module is configured to:
      store one or more dynamic bookmarks, each dynamic bookmark designating a corresponding Uniform Resource Locator (URL) and including a dynamic bookmark query parameter indicative of the dynamic bookmark;
      in response to accessing a first dynamic bookmark of the one or more bookmarks, make an Application Programming Interface (API) call to the corresponding URL;
      receive, responsive to the API call, a list of valid, updated bookmarks associated with the URL;
      display the list of valid, updated bookmarks in a window of the browser application; and
      enable, for each bookmark in the list of valid, updated bookmarks, a user to retrieve a linked resource corresponding to the bookmark in response to accessing the bookmark.

2. The method of claim 1, wherein the dynamic bookmark module is configured to: receive input from a user, the input including a name for the first dynamic bookmark and the URL corresponding to the first dynamic bookmark; and create a dynamic bookmark for the URL.

3. The method of claim 1, wherein receiving the list of valid, updated bookmarks associated with the URL comprises receiving a top-level list that includes at least one folder, wherein a sublist of valid, updated bookmarks contained in the at least one folder is not retrieved unless the at least one folder is accessed.

4. The method of claim 3, wherein the at least one folder is accessed by either: clicking on the folder in the browser application; or hovering over the folder in the browser application.

5. The method of claim 2, wherein the dynamic bookmark query parameter is indicative that one or more links associated with the URL are to be returned responsive to the bookmark.

6. The method of claim 2, further comprising, when the dynamic bookmark module is activated, issuing an API call for the URL with an indicator of the dynamic bookmark query parameter.

7. The method of claim 6, wherein the URL is a web page and wherein the API call for the URL returns a list of active bookmarks contained in the web page.

8. The method of claim 6, wherein the URL is a folder in a cloud storage and wherein the API call for the URL returns a list of active bookmarks to files contained in the folder.

9. The method of claim 6, further comprising: recognizing, by a resource identified by the URL, the indicator of the dynamic bookmark query parameter; and in response to recognizing the indicator of the dynamic bookmark query parameter, generating a set of one or more active bookmarks and returning the set of one or more active bookmarks to the browser application.

10. The method of claim 2, wherein the dynamic bookmark module comprises a plug-in to the browser application.

11. The method of claim 2, wherein the dynamic bookmark module comprises a software code that is integral to the browser application.

12. A method for avoiding manual user updates of invalid links by dynamically providing valid, updated bookmarks, the method comprising:
   receiving, at a server, a request, the request including a Uniform Resource Locator (URL) and a dynamic bookmark query parameter;
   recognizing, by the server, the dynamic bookmark query parameter in the request;

in response to recognizing the dynamic bookmark query parameter, retrieving a set of valid, updated bookmark links contained in a resource identified by the URL; and returning, in response to the request, the set of valid, updated bookmark links instead of the resource identified by the URL.

13. The method of claim 12, wherein the request comprises an Application Programming Interface (API) call.

14. The method of claim 12, wherein the server comprises a content server, wherein the resource identified by the URL comprises a folder, and wherein the set of valid, updated bookmark links comprise links to files contained in the folder.

15. The method of claim 12, wherein the server comprises a web page server, wherein the resource identified by the URL comprises a web page, and wherein the set of valid, updated bookmark links comprise links to items contained in the web page.

16. A computer program product comprising a non-transitory computer-readable medium storing instructions executable by one or more processors to perform:

storing one or more dynamic bookmarks, each dynamic bookmark designating a corresponding Uniform Resource Locator (URL) and including a dynamic bookmark query parameter indicative of the dynamic bookmark;

in response to accessing a first dynamic bookmark of the one or more bookmarks, making an Application Programming Interface (API) call to the corresponding URL;

receiving, responsive to the API call, a list of valid, updated bookmarks associated with the URL;

displaying the list of valid, updated bookmarks in a window of a browser application; and enabling, for each bookmark in the list of valid, updated bookmarks, a user to retrieve a linked resource corresponding to the bookmark in response to accessing the bookmark.

17. The computer program product of claim 16, wherein the instructions are further executable by the one or more processors to:

receive input from the user, the input including a name for the first dynamic bookmark and the URL corresponding to the first dynamic bookmark; and create a dynamic bookmark for the URL.

18. The computer program product of claim 16, wherein receiving the list of valid, updated bookmarks associated with the URL comprises receiving a top-level list that includes at least one folder, wherein a sublist of valid, updated bookmarks contained in the at least one folder is not retrieved unless the at least one folder is accessed.

19. The computer program product of claim 18, wherein the at least one folder is accessed by either: clicking on the folder in the browser application; or hovering over the folder in the browser application.

* * * * *